US006878423B2

(12) United States Patent
Nakanishi

(10) Patent No.: US 6,878,423 B2
(45) Date of Patent: Apr. 12, 2005

(54) TRANSFER SHEETS

(75) Inventor: Hideki Nakanishi, Takaishi (JP)

(73) Assignee: Daicel Chemical Industries, Ltd., Osaka (JP)

( * ) Notice: Subject to any disclaimer, the term of this patent is extended or adjusted under 35 U.S.C. 154(b) by 265 days.

(21) Appl. No.: 10/162,883

(22) Filed: Jun. 6, 2002

(65) Prior Publication Data

US 2003/0008114 A1 Jan. 9, 2003

(30) Foreign Application Priority Data

Jun. 15, 2001 (JP) ....................................... 2001-181642

(51) Int. Cl.$^7$ ........................... B32B 17/00; B32B 3/00; B32B 7/06; B41M 3/12; B41J 2/01

(52) U.S. Cl. ............................... 428/32.12; 428/32.37; 428/32.5; 428/32.51; 428/914; 347/103; 347/105; 430/200; 430/256; 430/259; 430/262; 156/240

(58) Field of Search ................................. 430/200, 256, 430/259, 262; 428/32.12, 32.51, 32.37, 32.5, 200, 914; 347/103, 105; 156/240

(56) References Cited

U.S. PATENT DOCUMENTS

| | | | | | |
|---|---|---|---|---|---|
| 5,501,902 A | | 3/1996 | Kronzer | | |
| 5,948,586 A | * | 9/1999 | Hare | .......................... | 430/256 |
| 6,139,672 A | * | 10/2000 | Sato et al. | .................. | 156/235 |
| 6,358,660 B1 | * | 3/2002 | Agler et al. | ................ | 430/256 |
| 6,495,241 B2 | * | 12/2002 | Sato et al. | .................. | 156/230 |
| 6,652,928 B2 | * | 11/2003 | Sato et al. | .................. | 347/105 |
| 6,716,493 B1 | * | 4/2004 | Notsu et al. | | |

FOREIGN PATENT DOCUMENTS

| | | |
|---|---|---|
| EP | 0 805 049 A1 | 11/1997 |
| EP | 0 881 092 A2 | 12/1998 |
| JP | A-9-290560 | 11/1997 |
| JP | A-10-16382 | 1/1998 |
| JP | A-2000-168250 | 6/2000 |
| WO | 00/64685 | 11/2000 |

* cited by examiner

*Primary Examiner*—Richard L. Schilling
(74) *Attorney, Agent, or Firm*—Birch, Stewart, Kolasch & Birch, LLP.

(57) ABSTRACT

A transfer sheet comprises a support, and a transfer layer for receiving an ink, wherein the transfer layer is formed in the support by heating at a predetermined temperature and is separable from the support. The hot-melt adhesive particle comprises a first particle having a melting point more than the predetermined temperature and a second particle having a melting point not more than the predetermined temperature. The transfer layer may further comprise a film-forming resin component and a dye fixing agent. The hot-melt adhesive particle may comprise a polyamide-series particle. In particular, the average particle size of the first particle may be 3 to 100 mm. The transfer sheet is excellent in stability on delivery of a paper as well as can prevent the inside of the printer from staining.

19 Claims, No Drawings

TRANSFER SHEETS

FIELD OF THE INVENTION

The present invention relates to a transfer sheet for an ink jet printer useful in forming a transfer image on an image-receiving material such as clothes by forming a record image with the use of an ink jet printer and transferring the record image to the image-receiving material (or member).

BACKGROUND OF THE INVENTION

Since an ink jet recording system is easily applicable to full-color image production, and is less noisy and superior in print quality, its system has been employed for recording an image on a transfer sheet. The properties of the transfer sheet necessary for ink jet recording usually include ink-absorption ability and ink-fixability. Furthermore, for carrying out stable print with use of an ink jet printer having an elaborative mechanism, it is necessary for the sheet to have stability in delivery of a paper and stability of a coating layer (or coat film) on the sheet. If a paper is not delivered stably, a printer is clogged with the paper and it is difficult to form or print a clear or sharp image, and if the coating layer on the sheet comes off at the inside of the printer, the inside of the printer is stained, as a result delivery of a paper or image formation is adversary affected.

On the other hand, for example, when a record image is thermal-transferred to an image-receiving material such as clothes to form a transfer image by means of this transfer sheet, not only thermal transferability and adhesiveness but also high water resistance and washing resistance are required of the sheet.

For example, Japanese Patent Application Laid-Open No. 16382/1998 (JP-10-16382A) discloses a transfer medium for an ink jet recording which comprises a support, a release layer and a transfer layer containing a fine particle of a thermoplastic resin and a polymeric adhesive of a thermoplastic resin disposed on the support. However, in the transfer medium, the fine particle is liable to come off from the transfer layer, and further, the transfer medium is inadequate in ink-fixability and water resistance.

Moreover, Japanese Patent Application Laid-Open No. 290560/1997 (JP-9-290560A) discloses an image-receiving sheet for ink jet comprising a release support and a transfer layer formed on the release support, wherein the transfer layer contains a filler particle, a water-soluble thermoplastic resin and if necessary, water-insoluble thermoplastic resin. However, the sheet is also inadequate in thermal transferability and adhesiveness. Moreover, the fine particle is liable to come off from the transfer layer and is liable to stain the inside of the printer. Furthermore, the sheet is inadequate in ink-fixability, water resistance, and the texture after transcription.

Furthermore, Japanese Patent Application Laid-Open No. 168250/2000 (JP-2000-168250A) discloses a thermal-transfer sheet which comprises a support, and an ink-receiving layer which is capable of separating from the support, contains at least a thermosetting resin and a hot-melt adhesive resin and is formed on at least one side of the support. However, stability in delivery of the sheet is not enough.

Thus, in the case where stability in delivery of a paper is increased, a fine particle is left off the paper and is liable to stain the inside of the printer. In the case where a fine particle is prevented from dropout, stability in delivery of a paper is reduced.

Accordingly, the object of the present invention is to provide a transfer sheet which has excellent stability in delivery of a paper as well as prevents the inside of the printer from staining.

It is another object of the present invention is to provide a transfer sheet which is excellent in thermal transferability and adhesiveness.

It is still another object of the present invention is to provide a transfer sheet which is excellent in water resistance, and excellent in texture in case of thermal-transferring to an image-receiving material (e.g., clothes, fabrics).

SUMMARY OF THE INVENTION

The inventors of the present invention did intensive research, and finally found that a transfer layer, which comprises at least two kinds or species of hot-melt adhesive fine particles varying in different melting point, is formed on a support so that stability in delivery of a paper and stainless of the inside of the printer can be dramatically improved. The present invention was accomplished based on the above findings.

That is, the transfer sheet of the present invention comprises a support, and a transfer layer for receiving an ink which is formed on the support by heating at a predetermined temperature and is separable from the support, wherein the transfer layer contains a hot-melt adhesive particle comprising a first particle having a melting point more than the predetermined temperature and a second particle having a melting point not more than the predetermined temperature. The melting point of the first particle may be more than 80° C., and the melting point of the second particle may be not more than 80° C. The average particle size of the first particle may be larger than the thickness of the transfer layer (e.g., about 30 to 100 $\mu$m). The ratio of the first particle relative to the second particle is about 99/1 to 80/20 (weight ratio), and preferably about 95/5 to 80/20. The first particle and the second particle may comprise a polyamide-series (nylon) particle (for example, a polyamide having at least one monomer unit selected from monomer units constituting nylon 11 and nylon 12, a polyamide formed by reacting a dimer acid and a diamine). The transfer layer may further comprise a film-forming resin component (for example, a hydrophilic polymer, an urethane-series resin, or a thermosetting or crosslinking resin). The transfer layer may further comprise a dye fixing agent.

The present invention also includes a method for producing a transfer sheet comprising a support and a transfer layer, wherein the method comprises applying, on a release side of the support, a coating agent composed of a first hot-melt adhesive particle and a second hot-melt adhesive particle, and drying the coating agent at a heating temperature to form the transfer layer, wherein the first particle has a melting point more than the heating temperature and the second particle has a melting point not more than the heating temperature.

The present invention also includes a method for transferring a record image to an image-receiving material, which comprises recording an image on the transfer layer of the transfer sheet by an ink jet recording system, bringing the transfer layer into contact with the image-receiving material and heating the transfer layer, and peeling the transfer layer from the support to transfer the record image to the image-receiving material.

DETAILED DESCRIPTION OF THE INVENTION

The transfer sheet of the present invention comprises a support and a transfer layer. The transfer layer is capable of separating from the support, contains a hot-melt adhesive particle and is heated at a predetermined temperature.

[Support]

As a support, any of supports such as opaque, semitransparent and transparent supports can be used as far as the transfer layer (or the protecting layer) is capable of separating from the support. Examples of the support usually include a release (releasable) support, for example, a release-treated paper (a release paper), a synthetic paper, a chemical (artificial) fiber paper and a plastic film, and each may be treated for providing releasability.

As a synthetic paper, there may be mentioned, a variety of synthetic papers such as a paper made with polypropylene, polystyrene or the like.

As a chemical fiber paper, there may be mentioned, a variety of chemical fiber papers made with chemical fibers such as nylon fiber, acrylic fiber, polyester fiber and polypropylene fiber.

As polymers constituting the plastic film, a variety of resins (a thermoplastic resin and a thermosetting resin) can be used, and a thermoplastic resin is usually employed. As the thermoplastic resin, there may be mentioned polyolefin-series (polyolefinic) resins (e.g., poly$C_{2-4}$olefin-series resins such as a polypropylene), cellulose derivatives (e.g., cellulose esters such as a cellulose acetate), polyester-series resins (e.g., polyalkylene terephthalates such as a polyethylene terephthalate and a polybutylene terephthalate, polyalkylene naphthalates such as a polyethylene naphthalate and a polybutylene naphthalate, or copolyesters thereof), polyamide-series resins (e.g., a polyamide 6, a polyamide 6/6), vinyl alcohol-series resins (e.g., a polyvinyl alcohol, an ethylene-vinyl alcohol copolymer), polycarbonates and the like. Among these films, a polypropylene, a polyester-series resin, a polyamide-series resin or the like is usually employed. In particular, polyester-series resins (especially, a polyethylene terephthalate) are preferred from viewpoints of mechanical strength, heat resistance and workability.

The thickness of the support can be selected according to its use or application, and is usually, for example, about 10 to 250 $\mu$m, and preferably about 15 to 200 $\mu$m.

The releasability can be provided or imparted by a conventional method, for example, by treating the support with a releasing agent (e.g., a wax, a salt of a higher fatty acid, an ester of a higher fatty acid, an amide of a higher fatty acid, a silicone oil) or by containing the releasing agent in the support. In case of the paper, the releasability can be imparted by coating the paper with a releasing agent (e.g., a silicone oil) after anchor treatment (e.g., clay-coat). If necessary, to the plastic film may be added a conventional additive such as a stabilizer (e.g., an antioxidant, an ultraviolet ray absorber, a thermal stabilizer), a lubricant, a nucleation agent, a filler and a pigment.

[Transfer Layer]

In the transfer sheet of the present invention, the transfer layer contains a hot-melt adhesive particle (a hot-melt adhesive fine particle) and further may contain a film-forming (film-formable) resin component, and a dye fixing agent.

(Hot-Melt Adhesive Particle)

The hot-melt adhesive particle comprises a first hot-melt adhesive fine particle (i.e., a first particle) having a melting point higher than the heating temperature of the transfer layer and a second hot-melt adhesive fine particle (i.e., a second particle) having a melting point not more than the above heating temperature. The heating temperature of the transfer layer is usually a temperature for drying the transfer layer applied or coated on the sheet to form into a layer (e.g., about 70 to 90° C.).

(1) The First Hot-Melt Adhesive Fine Particle

The first hot-melt adhesive fine particle forms unevenness on a surface of a transfer layer mainly, gives stability in delivery of a paper and transferability, and in addition, imparts high hot-melt adhesiveness to the transfer layer.

The melting point of the first hot-melt adhesive fine particle needs only be over the heating temperature, and depending on the heating temperature, for example, the melting point is about 85 to 200° C., preferably about 90 to 170° C. (e.g., about 90 to 150° C.), more preferably about 90 to 120° C. (particularly about 100 to 120° C.). Since the melting point of the first hot-melt adhesive fine particle is higher than the heating temperature, the particle exists as or retains fine particle-shape (or form) without melting in the production step of the transfer layer, and forms unevenness on a surface of the sheet.

The hot-melt adhesive resin includes a variety of resins, for example, olefinic resins (e.g., a polyethylene, an ethylene-propylene copolymer, an atactic polypropylene), ethylene copolymer resins [e.g., an ethylene-vinyl acetate copolymer, an ethylene-(meth)acrylic acid copolymer, an ethylene-ethyl (meth)acrylate copolymer, an ionomer], polyamide-series (nylon-series) resins, polyester-series resins, polyurethane-series resins, acrylic resins, rubbers and the like. These hot-melt adhesive resins may be used singly or in combination. The hot-melt adhesive resin is usually water-insoluble. The hot-melt adhesive resin may be a reactive hot-melt adhesive resin having a reactive group (e.g., a carboxyl group, a hydroxyl group, an amino group, an isocyanate group, a silyl group) at a terminal position.

The preferred resin for imparting the thermal-transferability and durability (e.g., washing resistance) is a polyamide-series (nylon-series) resin, a polyester-series resin, a polyurethane-series resin or the like. In particular, when an image-receiving material is clothes (such as woven clothes, non-woven clothes) or the like, a hot-melt adhesive resin composed of a polyamide-series (nylon-series) resin can provide a transfer image with excellent washing resistance and water resistance, and superior texture.

As the polyamide-series (nylon-series) hot-melt adhesive resins, there may be mentioned nylon 6, nylon 46, nylon 66, nylon 610, nylon 612, nylon 11, nylon 12, a polyamide resin formed by reacting a dimer acid with a diamine, a polyamide-series elastomer (e.g., a polyamide with polyoxyalkylene diamine as a soft segment). These nylons (polyamides) may be used singly or in combination. Among them, the preferred nylon includes a nylon having at least one monomer unit selected from monomer units constituting nylon 11 and nylon 12 (e.g., a homopolyamide such as nylon 11 and nylon 12, a copolyamide such as nylon 6/11, nylon 6/12, nylon 66/12, a copolymer of a dimer acid, a diamine and a laumlactam or an aminoundecanoic acid), a polyamide resin formed by reacting a dimer acid and a diamine.

The polyester-series hot-melt adhesive resin includes a homopolyester resin, a copolyester resin and a polyester-series elastomer, which employ at least an aliphatic diol or an aliphatic dicarboxylic acid. The homopolyester resin includes a saturated aliphatic polyester resin formed by reacting an aliphatic diol (e.g., $C_{2-10}$alkylene diols such as ethylene glycol, propylene glycol, 1,4-butanediol, 1,6-hexanediol, polyoxy$C_{2-4}$alkylene glycols such as diethylene glycol), an aliphatic dicarboxylic acid (e.g., $C_{4-14}$aliphatic dicarboxylic acid such as adipic acid, suberic acid, azelaic acid, sebacic acid, and dodecanedicarboxylic acid), and if necessary, lactone (e.g., butyrolactone, valerolactone, caprolactone and laurolactone). The copolyester resin includes a saturated polyester resin obtained by substituting a part of components (a diol component and/or a terephthalic acid) constituting a polyethylene terephthalate or a polybutylene terephthalate with the other diols (e.g., $C_{2-6}$alkylene glycols such as ethylene glycol, propylene glycol, and 1,4-butanediol, polyoxyalkylene glycols such as diethylene glycol and triethylene glycol, cyclohexanedimethanol) or the other dicarboxylic acids (e.g., the above aliphatic dicarboxylic acid, an asymmetric aromatic dicarboxylic acid such as phthalic acid and isophthalic acid), or the above lactones. The polyester-series elastomer includes an elastomer having a $C_{2-4}$alkylene arylate (e.g., ethylene terephthalate, buthylene terephthalate) as a hard segment and a (poly) oxyalkylene glycol as a soft segment. A polyester resin having an urethane bond, for example, a resin in which its molecular weight is increased with the use of the diisocyanate may be employed as the polyester-series resin. These polyesters can be used singly or in combination.

The polyurethane-series hot-melt adhesive resin includes a polyurethane resin obtained with the use of, as at least one part of diol component, the polyester diol corresponding to the polyester-series hot-melt adhesive resin. An aromatic, an araliphatic, an alicyclic or an aliphatic diisocyanate is used as the diisocyanate component. These polyurethanes can be used singly or in combination.

In order to give stability in delivery of the paper and the hot-melt adhesiveness effectively by protruding the first hot-melt adhesive fine particle from the transfer layer surface, the first hot-melt adhesive fine particle may comprise a particulate or powdery resin having a larger average particle size than the thickness of the transfer layer. The average particle size of the fine particle is, for example, about 10 to 200 μm, preferably about 30 to 100 μm, and more preferably about 40 to 80 μm (particular, about 50 to 70 μm).

(2) The Second Hot-Melt Adhesive Fine Particle

The second hot-melt adhesive fine particle prevents the first hot-melt adhesive fine particle from coming off from the transfer layer, increases running-stability at the inside of the printer, and imparts hot-melt adhesiveness.

The melting point of the second hot-melt adhesive fine particle is not higher than the heating temperature and the second hot-melt adhesive fine particle needs only be capable of being melt at the heating temperature. Depending on the heating temperature, for example, the melting point is about 40 to 80° C., preferably about 50 to 80° C., and more preferably about 60 to 80° C. Since the melting point of the second hot-melt adhesive fine particle is not higher than the heating temperature, the second hot-melt adhesive fine particle allows to keep the first fine particle on the transfer layer stably probably because the second fine particle may be melted in the production step of the transfer layer to participate in forming of the layer.

There is no particular restriction as to the average particle size of the second hot-melt adhesive fine particle. The average particle size of the second hot-melt adhesive fine particle can be suitably selected from the range of about 1 to 300 μm, and is usually about 10 to 200 μm, preferably about 30 to 100 μm, and more preferably about 40 to 80 μm similar to that of the first hot-melt adhesive fine particle. Moreover, the kind or species of the hot-melt adhesive resins is similar to that of the first hot-melt adhesive fine particle.

The difference in melting point between the first hot-melt adhesive fine particle and the second hot-melt adhesive fine particle is about not less than 5° C. (e.g., about 5 to 100° C.), preferably about not less than 10° C. (e.g., about 10 to 70° C.), more preferably about 20 to 70° C. (e.g., about 20 to 50° C.), and particularly about 30 to 70° C. (e.g., about 30 to 50° C.).

The ratio (weight ratio) of the first hot-melt adhesive fine particle relative to the second hot-melt adhesive fine particle is the former/the latter=about 99.5/0.5 to 50/50, preferably about 99/1 to 70/30, and more preferably about 99/1 to 80/20 (in particular, about 95/5 to 80/20).

The amount of the hot-melt adhesive particle is, on solid basis, about 10 to 10,000 parts by weight (e.g., about 10 to 5,000 parts by weight), preferably about 10 to 3,000 parts by weight (e.g., about 10 to 2,000 parts by weight), more preferably about 100 to 1,000 parts by weight (e.g., about 150 to 1,000 parts by weight), and usually about 150 to 5,000 parts by weight relative to 100 parts by weight of the film-forming resin component.

(Film-Forming Resin Component)

The film-forming resin component is not particularly limited as far as it has the film-forming properties, a variety of thermoplastic resins (e.g., polyamide-series resins, polyester-series resins, styrenic resins, polyolefinic resins, cellulose derivatives, polycarbonate-series resins, polyvinyl acetate-series resins, acrylic resins, vinyl chloride-series resins, thermoplastic urethane-series resins) and thermosetting resins can be used. Among these film-forming resin components, at least one selected from the group consisting of a hydrophilic polymer, an urethane-series resin, and a thermosetting or a crosslinking resin is preferred. These film-forming resin components can be used singly or in combination.

(1) The Hydrophilic Polymer

The transfer layer may contain a hydrophilic polymer in order to make an ink retainability better.

The hydrophilic polymer includes a variety of polymers having an affinity for water, for example, a water-soluble polymer, a water-dispersable polymer, and a polymer which is water-insoluble and has water-absorbing.

As the hydrophilic polymer, there maybe mentioned, for example, polyoxyalkylene glycol-series resins (polyoxy$C_{2-4}$ alkylene glycols such as polyethylene glycol, polypropylene glycol, ethylene oxide-propylene oxide block copolymer, and polytetramethylene ether glycol), acrylic polymers [e.g., poly(meth)acrylic acid or a salt thereof, methyl methacrylate-(meth)acrylic acid copolymer, acrylic acid-polyvinylalcohol copolymer], vinyl ether-series polymers (e.g., polyvinyl alkyl ethers such as polyvinyl methyl ether and polyvinyl isobutyl ether, $C_{1-6}$alkyl vinyl ether-maleic anhydride copolymer), styrenic polymers [e.g., styrene-maleic anhydride copolymer, styrene-(meth)acrylic acid copolymer, polystyrenesulfonic acid or a salt thereof], vinyl acetate-series polymers (e.g., vinyl acetate-(meth)acrylic acid copolymer, vinyl acetate-methyl acrylate copolymer), vinyl alcohol-series polymers (polyvinyl alcohol, a modified polyvinyl alcohol, ethylene-vinyl alcohol copolymer), cellulose derivatives (e.g., cellulose ethers such as methyl cellulose, ethyl cellulose, hydroxyethyl cellulose, and carboxymethyl cellulose, cellulose esters such as cellulose acetate), hydrophilic natural polymers or derivatives thereof (e.g., alginic acid or a salt thereof, gum arabic, gelatin, casein, dextrin), nitrogen-containing polymers (or cationic polymers) or salts thereof [e.g., quaternary ammonium salts such as polyvinylbenzyltrimethylannmonium chloride, and polydiallyldimethylammonium chloride, polydimethylaminoethyl (meth)acrylate hydrochloride, polyvinylpyridine, polyethylene imine, polyacryl amide, polyvinyl pyrrolidone]. The salt of the hydrophilic polymer (in particular, a salt of carboxyl group or sulfonic acid group) includes an ammonium salt, an amine salt, an alkali metal salt such as sodium salt. These hydrophilic polymers can be used singly or in combination.

Among the hydrophilic polymers, hydroxyl group-containing hydrophilic polymers [for example, polyoxyalkylene glycol-series resins, vinyl alcohol-series polymers (polyvinyl alcohol, a modified polyvinyl alcohol), cellulose derivatives (e.g., hydroxyethylcellulose)], carboxyl group-containing hydrophilic polymers (e.g., an acrylic polymer), nitrogen-containing polymers (e.g., cationic polymers, polyvinylpyrrolidone), in particular, polyoxyalkylene glycol-series resins are preferred. As polyoxyalkylene glycol-series resins, polyoxyalkylene glycol-series resins having an oxyethylene unit is preferred, and for example, there may be mentioned polyethylene glycol (homopolymer), or a copolymer of ethylene oxide with at least one selected from the group consisting of a $C_{3-4}$alkylene oxide, a hydroxyl group-containing compound (e.g., polyhydric alcohols such as glycerin, trimethylolpropane, trimethylolethane and bisphenol A), a carboxyl group-containing compound (e.g., $C_{2-4}$carboxylic acids such as acetic acid, propionic acid, butyric acid) and an amino group-containing compound (e.g., an amine, an ethanolamine). The weight-average molecular weight of the hydrophilic polymer is about 100 to 50,000, preferably about 500 to 10,000, and more preferably about 1,000 to 5,000.

(2) Urethane-series Resins

The transfer layer may further contain urethane-series resins for excellent texture (softness).

The urethane-series resin comprises, for example, a urethane-series polymer obtained by reacting a diisocyanate component with a diol component, and if necessary, a diamine component may be used as a chain-extending agent.

As the diisocyanate component, there may be mentioned aromatic diisocyanates (e.g., phenylene diisocyanate, tolylene diisocyanate, diphenylmethane-4,4'-diisocyanate), araliphatic diisocyanates (e.g., xylylene diisocyanate), alicyclic diisocyanates (e.g., isophorone diisocyanate), aliphatic diisocyanates (e.g., 11,6-hexamethylene diisocyanate, lysine diisocyanate). Adducts of a diisocyanate compound may be used as the diisocyanate component. If necessary, polyisocyanate components such as triphenylmethane triisocyanate may be used in combination. The diisocyanate components may be used singly or in combination.

As examples of the diol component, there may be mentioned polyester diols, polyether diols, polycarbonate diols. The diol components may be used singly or in combination.

The polyester diol may be a polyester diol derived from a lactone, not being limited to polyester diols obtained by reacting a diol with a dicarboxylic acid or a reactive derivative thereof (e.g., a lower alkyl ester, an acid anhydride). As examples of the diol, there may be mentioned aliphatic diols (e.g., $C_{2-10}$alkylene diol such as ethylene glycol, trimethylene glycol, propylene glycol, 1,3-butanediol, 1,4-butanediol, hexamethylene glycol, neopentyl glycol; polyoxy$C_{2-4}$ alkylene glycol such as diethylene glycol, triethylene glycol), alicyclic diols and aromatic diols. The diols may be used singly or in combination. If necessary, polyols such as trimethylol propane and pentaerythritol may be used in combination with the above diol. The diol is usually an aliphatic diol.

As examples of the dicarboxylic acid, there may be mentioned aliphatic dicarboxylic acids (e.g., $C_{4-14}$aliphatic dicarboxylic acids such as adipic acid, suberic acid, azelaic acid, sebacic acid, dodecanedicarboxylic acid), alicyclic dicarboxylic acids, aromatic dicarboxylic acids (e.g., phthalic acid, terephthalic acid, isophthalic acid). The dicarboxylic acids may be used singly or in combination. If necessary, a polycarboxylic acid such as trimellitic acid and pyromelitic acid may be used in combination with the dicarboxylic acid.

As examples of the lactone, there may be mentioned butyrolactone, valerolactone, caprolactone and laurolactone. The lactones may be used singly or in combination.

The urethane-series resin may be a polyether-type urethane-series resin obtained with the use of a polyether diol (e.g., polyoxytetramethyleneglycol) as a diol component, but a polyester-type urethane-series resin obtained with the use of at least a polyester diol (in particular, an aliphatic polyester diol obtained with use of an aliphatic component as a main reaction component) is preferred, and the polyester-type urethane-series resin includes, for example, a urethane resin obtained by reacting a diisocyanate such as isophorone diisocyanate with a polyester diol, which is obtained by reacting a $C_{2-6}$alkylene diol such as 1,4-butandiol, with a $C_{4-12}$aliphatic dicarboxylic acid such as adipic acid and isophthalic acid or phthalic acid, or a polyester diol, which is derived from the above lactone.

It is preferred that the urethane-series resin is used as an organic solvent solution, an aqueous solution, an aqueous emulsion. The aqueous solution or the aqueous emulsion of the urethane-series resin may be prepared by dissolving or emulsion-dispersing a urethane-series resin with the use of an emulsifying agent, or by introducing a ionic functional group such as a free carboxyl group and a tertiary amino group into a molecule of a urethane-series resin and dissolving or dispersing the urethane-series resin with the use of an alkali or an acid. Such an urethane-series resin in which a free carboxyl group or a tertiary amino group is introduced into its molecule comprises an urethane-series resin obtained by reacting a diisocyanate component with a diol component having a free carboxyl group or a tertiary amino group (in particular, a polymeric diol). Incidentally, the diol having a free carboxyl group (in particular, a polymeric diol) can be obtained by a process which comprises reacting a diol component with a polycarboxylic acid or an anhydride thereof having three or more carboxyl groups (e.g., a tetrabasic or tetracarboxylic acid anhydride such as pyromellitic acid anhydride) or polycarboxylic acid having a sulfonic acid group (e.g., sulfoisophthalic acid), or a process which comprises ring-opening-polymerizing a lactone with the use of dimethylol propionic acid as an initiator. Moreover, the diol having a tertiary amino group (especially, a polymeric diol) can be prepared by ring-opening-polymerizing an alkyleneoxide or a lactone with the use of N-methyldiethanolamine or the like as an initiator. The tertiary amino group may form a quaternary ammonium salt. Such an urethane-series polymer into which a tertiary amino group or a quaternary ammonium salt is introduced [a cation-type urethane-series resin (cationic urethane-series resin)] is commercially available as, for example, F-8559D (manufactured by Daiichi Kogyo Seiyaku, Co. Ltd.), PERMARIN UC-20 (manufactured by Sanyo Kasei Kogyo, Co. Ltd.). The urethane-series resins may be used singly or in combination.

(3) Thermosetting Resin or Crosslinking Resin

A thermosetting resin or a crosslinking resin may be, for example, a phenolic resin, an alkyd resin, an unsaturated polyester resin, an epoxy-series resin, a vinyl ester-series resin, silicone-series resin or the like, but a self-crosslinking resin (a thermoplastic resin having a self-crosslinking group), for example, a self-crosslinking polyester-series resin, a self-crosslinking polyamide-series resin, a self-crosslinking acrylic resin, a self-crosslinking olefinic resin and the like are preferred. Among them, a self-crosslinking acrylic resin (e.g., an acrylic silicone resin) is particularly preferred.

The self-crosslinking (self-crosslinkable) resin comprises a polymer composed of a monomer having at least a self-crosslinking group [e.g., epoxy group, methylol group, a hydrolyzed condensate group (e.g., silyl group), aziridinyl group] as a constituting unit.

A monomer having the self-crosslinking group (i.e., a monomer containing a crosslinking functional group) includes a variety of monomers, for example, epoxy group-containing monomers [e.g., glycidyl (meth)acrylate, (meth) allyl glycidyl ether, 1-allyloxy-3,4-epoxybutane, 1-(3-butenyloxy)-2,3-epoxypropane, 4-vinyl-1-cyclohexane-1,2-epoxide], a methylol group-containing monomers or derivatives thereof [e.g., N-$C_{1-4}$alkoxymethyl (meth) acrylamides such as N-methylol (meth)acrylamide, and N-methoxymethyl (meth)acrylamide, N-butylol (meth) acrylamide], a monomer containing a hydrolyzed condensate group such as silyl group [e.g., vinyltrimethoxysilane, vinyltriethoxysilane, vinyltributoxysilane, vinylmethoxydimethylsilane, vinylethoxydimethylsilane, vinylisobutoxydimethylsilane, vinyldimethoxymethylsilane, vinyldiethoxymethylsilane, vinyltris(2-methoxyethoxy)silane, vinyldiphenylethoxysilane, vinyltriphenoxysilane, 3-(vinylphenylaminopropyl)trimethoxysilane, 3-(vinylbenzylaminopropyl)trimethoxysilane, 3-(vinylphenylaminopropyl)triethoxysilane, 3-(vinylbenzylaminopropyl)triethoxysilane, divinyldimethoxysilane, divinyldiethoxysilane, divinyldi(2-methoxyethoxy)silane, vinyldiacetoxymethylsilane, vinyltriacetoxysilane, vinylbis(dimethylamino) methylsilane, vinylmethyldichlorosilane, vinyldimethylchlorosilane, vinyltrichlorosilane, vinylmethylphenylchlorosilane, allyltriethoxysilane, 3-allylaminopropyltrimethoxysilane, allyldiacetoxymethylsilane, allyltriacetoxysilane, allylbis (dimethylamino)methylsilane, allylmethyldichlorosilane, allyldimethylchlorosilane, allyltrichlorosilane, methallylphenyldichlorosilane, 2-(meth) acryroxyethyltrimethoxysilane, 2-(meth) acryroxyethyltriethoxysilane, 3-(meth) acryroxypropyltrimethoxysilane, 3-(meth) acryroxypropyltriethoxysilane, 3-(meth) acryroxypropylmethyldimethoxysilane, 3-(meth) acryroxypropylmethyldichlorosilane, 3-(meth) acryroxypropyltris(2-methoxyethoxy)silane], an aziridinyl group-containing monomer [e.g., 2-(1-aziridinyl)ethyl (meth)acrylate, 2-(1-aziridinyl)propyl (meth)acrylate, 3-(1-aziridinyl)propyl (meth)acrylate]. The monomers containing a crosslinking functional group can be used singly or in combination.

The preferred monomer containing a crosslinking functional group has a hydrolyzed condensate group, in particular, an alkoxysilyl group (e.g., $C_{1-4}$alkoxy silyl groups such as methoxysilyl group, ethoxysiliyl group). An acrylic resin having the above hydrolyzed condensate group is preferred as the thermosetting or crosslinking resin.

The thermosetting or crosslinking resin may comprise the monomer containing a crosslinking functional group and the other monomers (e.g., monomers such as monomers containing a cationic functional group, hydrophilic monomers, nonionic monomers).

As the monomer containing a cationic functional group, there may be mentioned, for example, di$C_{1-4}$alkylamino-$C_{2-3}$alkyl(meth)acrylamides or salts thereof [e.g., dimethylaminoethyl(meth)acrylamide, diethylaminoethyl (meth)acrylamide, dimethylaminopropyl(meth)acrylamide, diethylaminopropyl(meth)acrylamide], di$C_{1-4}$alkylamino-$C_{2-3}$alkyl(meth)acrylates or salts thereof [e.g., dimethylaminoethyl(meth)acrylate, diethylaminoethyl (meth)acrylate, dimethylaminopropyl(meth)acrylate, diethylaminopropyl (meth)acrylate], di$C_{1-4}$alkylamino-$C_{2-3}$alkyl group-substituted aromatic vinyl compounds or salts thereof [e.g., 4-(2-dimethylaminoethyl)styrene, 4-(2-dimethylaminopropyl)styrene], nitrogen-containing heterocyclic monomers or salts thereof [e.g., vinylpyridine, vinylimidazole, vinylpyrrolidone]. As the salt, there may be mentioned a hydrohalogenic acid salt (e.g., hydrochloride, hydrobromide), a sulfate, an alkylsulfate (e.g., methylsulfate, ethylsulfate), an alkylsulfonate, an arylsulfonate, a carboxylate (e.g., acetate). Incidentally, a quaternary ammonium salt group may be formed by reacting a tertiary amino group with an alkylating agent (e.g., epichlorohydrin, methyl chloride, benzyl chloride).

The cationic monomer (e.g., a monomer having a tertiary amino group or salt thereof group, a monomer having or capable of forming a quaternary ammonium salt group) may be copolymerized with the monomer containing a crosslinking functional group to obtain a cationic polymer (a crosslinking polymer) having a crosslinking group, and thus obtained polymer may be improved in fixability and water resistance.

The hydrophilic monomer includes a copolymerizable monomer having a hydrophilic group such as a carboxyl group, an acid anhydride group, a hydroxyl group, an amido group, a sulfonic acid group, an ether group, a polyoxyalkylene group and the like.

As the carboxyl group-containing monomer, there may be mentioned unsaturated carboxylic acids or acid anhydrides thereof such as (meth)acrylic acid, itaconic acid, maleic acid, maleic anhydride, fumaric acid, and crotonic acid, and salts thereof (e.g., alkali metal salts, alkaline earth metal salts, ammonium salts, amine salts), half-esters of an unsaturated polycarboxylic acid or a acid anhydride thereof with a linear or branched alcohol having about 1 to 20 carbon atoms (e.g., monomethyl malate, monoethyl malate, mono2-ethylhexyl malate).

As a hydroxyl group-containing monomer, there may be mentioned a hydroxyalkyl ester of an unsaturated fatty acid [e.g., a hydroxyhydroxy$C_{2-6}$alkyl ester of a carboxylic acid, for example, a hydroxy$C_{2-6}$alkyl (meth)acrylate such as 2-hydroxyethyl (meth)acrylate, 2-hydroxypropyl (meth) acrylate, 3-hydroxypropyl (meth)acrylate, and 4-hydroxybutyl (meth)acrylate, amono- or dihydroxy$C_{2-6}$ alkyl malate such as 2-hydroxyethylmethyl malate, di(2-hydroxypropyl) malate], an aliphatic, alicyclic, or aromatic vinyl compound having a hydroxyl group (e.g., α-hydroxystyrene).

As an amido group-containing monomer, there may be mentioned a $C_{2-8}$carboxylic amide which may be substituted with a substituent such as a $C_{1-4}$alkyl group, a $C_{1-4}$alkoxy group, a $C_{1-4}$acyl group and the like [e.g., a (meth) acrylamide such as (meth)acrylamide, α-ethyl(meth) acrylamide, N-methyl(meth)acrylamide, N-butoxymethyl (meth)acrylamide, diacetone (meth)acrylamide].

As sulfonic acid group-containing monomer, there may be mentioned such as an aliphatic, an alicyclic, or an aromatic vinyl compound having a sulfonic acid group such as styrenesulfonic acid and vinylsulfonic acid, or a sodium salt thereof.

As an ether group-containing monomer, there may be mentioned a vinyl ether such as vinyl methyl ether, vinyl ethyl ether, and vinyl isobutyl ether.

As a polyoxyalkylene group-containing monomer, there may be mentioned diethylene glycol mono(meth)acrylate, triethylene glycol mono(meth)acrylate, polyethylene glycol mono(meth)acrylate.

These hydrophilic monomers can be used singly or in combination.

The preferred hydrophilic monomer includes carboxyl group-containing monomers, in particular, a (meth)acrylic acid or its salt (e.g., sodium salt, potassium salt), hydroxyl group-containing monomers [e.g., 2-hydroxylethyl (meth) acrylate, hydroxypropyl (meth)acrylate], polyoxyalkylene unit-containing monomers [e.g., diethylene glycol mono (meth)acrylate, triethylene glycol mono(meth)acrylate, polyethylene glycol mono(meth)acrylate].

The monomer containing a crosslinking functional group, the cationic functional group-containing monomer and the hydrophilic monomer can be used in combination.

These monomers may be used in combination with a nonionic monomer in order to adjust the film-formability and film-forming properties.

As the nonionic monomer, there may be mentioned, for example, an alkyl ester [e.g., a $C_{1-18}$alkyl ester of (meth) acrylic acid such as methyl (meth)acrylate, ethyl (meth) acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate], a cycloalkyl ester [e.g., cyclohexyl (meth)acrylate], an aryl ester [e.g., phenyl (meth)acrylate], an aralkyl ester [e.g., benzyl (meth)acrylate], an aromatic vinyl compound [e.g., styrene, vinyl toluene, a-methyl styrene], a vinyl ester [e.g., vinyl acetate, vinyl propionate, vinyl versatate], an allyl ester [e.g., allyl acetate], a halogen-containing monomer [e.g., vinylidene chloride, vinyl chloride], vinyl cyanide [e.g., (meth)acrylonitrile], an olefin [e.g., ethylene, propylene].

These nonionic monomers can be used singly or in combination.

As the nonionic monomer, a $C_{1-18}$alkyl ester of (meth) acrylic acid [in particular, a $C_{2-10}$alkyl ester of acrylic acid, a $C_{1-6}$alkyl ester of methacrylic acid], an aromatic vinyl compound [in particular, styrene], a vinyl ester [in particular, vinyl acetate] can be used.

The thermosetting or crosslinking resin may comprise a copolymer of the crosslinking functional group-containing monomer (the monomer containing a crosslinking functional group) and if necessary, at least one monomer selected from the group consisting of the cationic functional group-containing monomer, the hydrophilic monomer and the nonionic monomer (in particular, the cationic functional group-containing monomer). Preferably, the thermosetting or crosslinking resin may be a copolymer of the monomer containing a crosslinking functional group and the cationic functional group-containing monomer, and further, at least one monomer selected from the group consisting of the hydrophilic monomer and the nonionic monomer (in particular, the hydrophilic monomer).

The preferred combinations of the monomers are as follows:

Crosslinkable monomer: a silyl group-containing (meth) acrylate, for example, a (meth)acryloyloxy-$C_{2-3}$alkyltri$C_{1-2}$ alkoxysilane Cationic functional group-containing monomer: a di$C_{1-4}$ alkylamino-$C_{2-3}$alkyl(meth)acrylate or a quaternary ammonium salt thereof Hydrophilic monomer: an unsaturated carboxylic acid A polymerization manner of a copolymer composed of the above monomers is not particularly limited, and may be, for example, a random copolymer or the like.

In the total monomers, the amount of the monomer containing a crosslinking functional group is about 0.1 to 20% by weight, preferably about 0.1 to 10% by weight, and more preferably about 1 to 5% by weight, and the amount of the monomer containing a cationic functional group is about 1 to 50% by weight, preferably about 5 to 45% by weight, and the amount of the hydrophilic monomer is about 0 to 30% by weight (e.g., about 0.1 to 30% by weight), preferably about 0.1 to 20% by weight, and more preferably about 0.5 to 15% by weight, and the balance comprises the nonionic monomer.

In the preferred embodiment, as to the amount of the monomers, the amount of the cationic functional group-containing monomer is about 300 to 1,000 parts by weight, preferably about 500 to 800 parts by weight, and the amount of the hydrophilic monomer is about 100 to 500 parts by weight, and preferably about 200 to 300 parts by weight relative to 100 parts by weight of the monomer containing a crosslinking functional group.

The form of the thermosetting or crosslinking resin may be a solution such as an organic solvent solution and an aqueous solution, but is usually an emulsion (in particular, an aqueous emulsion). An emulsion containing a crosslinking polymer can be obtained by a conventional method, for example, a method which comprises emulsion-polymerizing the monomers in the emulsion-polymerization system containing a nonionic surfactant and/or a cationic surfactant, or a method which comprises polymerizing the monomers followed by forming a tertiary amine salt or a quaternary ammonium salt to obtain an aqueous emulsion.

Incidentally, the thermosetting or crosslinking resin, the urethane-series resin and the hydrophilic polymer may be employed in combination, for example, by previously mixing them. Moreover, the thermosetting or crosslinking resin and the urethane-series resin may be used in a form of a composite or a complex by a process which comprises emulsion polymerizing a monomer composed of an acrylic monomer (in particular, a cationic monomer) in the presence of an urethane-series resin emulsion. The thermosetting or crosslinking resin can be used singly or in combination.

Further, it is particularly preferred that the hydrophilic polymer and the urethane-series resin are employed in combination. The ratio (weight ratio) of the both sides is the hydrophilic polymer/the urethane-series resin=about 90/10 to 10/90, preferably about 70/30 to 30/70, and more preferably about 60/40 to 40/60.

(Dye Fixing Agent)

Further, the transfer layer may contain a cationic compound (dye fixing agent having a low molecular weight) or a polymeric dye fixing agent as a dye fixing agent in order to improve a fixability of a coloring agent (dye). In particular, in the film-forming (film-formable) resin component, when a cationic monomer is not introduced to the resin, it is preferred that the dye fixing agent is employed. These dye fixing agents can be used singly in combination. Among these dye fixing agents, a cationic compound, in particular, a quaternary ammonium salt is preferred.

(1) Cationic Compounds

The cationic compound includes an aliphatic amine salt, a quaternary ammonium salt (e.g., an aliphatic quaternary ammonium salt, an aromatic quaternary ammonium salt, a heterocyclic quaternary ammonium salt). These cationic compounds can be used singly or in combination. Among them, the preferred cationic compound includes an aliphatic quaternary ammonium salt (e.g., a tetra$C_{1-6}$alkylammonium halide such as tetramethylammonium chloride, tetraethylammonium chloride, tetramethylammonium bromide and tetraethylammonium bromide, a tri$C_{1-6}$alkyl$C_{8-20}$ alkylammonium halide such as trimethyllaurylammonium chloride and trimethyllaurylammonium bromide, a di$C_{1-6}$ alkyldi$C_{8-20}$alkylammonium halide such as dimethyldilaurylammonium chloride and dimethyldilaurylammonium bromide), especially a tetra$C_{1-4}$alkylammonium halide (e.g., a tetra$C_{1-2}$alkylammonium halide), a tri$C_{1-4}$alkyl$C_{10-16}$ alkylammonium halide (e.g., a tri$C_{1-2}$alkyl$C_{10-14}$ alkylammonium halide), a di$C_{1-4}$alkyldi$C_{10-16}$ alkylammonium halide (e.g., a di$C_{1-2}$alkyldi$C_{10-14}$ alkylammonium halide).

(2) Polymeric Dye Fixing Agents

The polymeric dye fixing agent usually has a cationic group (in particular, a strong cationic group such as a guanidyl group and a quaternary ammonium salt group) in its molecule.

As the polymeric dye fixing agent, there may be mentioned, for example, a dicyane-series compound (e.g., a dicyanediamide-formaldehyde polycondensate), a polyamine-series compound [e.g., an aliphatic polyamine such as diethylenetriamine, an aromatic polyamine such as phenylenediamine, a condensate of a dicyandiamide and a (poly)$C_{2-4}$alkylenepolyamine (e.g., a dicyanediamide-diethylenetriamine polycondensate)], a polycationic compound and the like. As the polycationic compound, there may be mentioned, for example, an epichlorohydrine-di$C_{1-4}$ alkylamine addition polymer (e.g., an addition polymer of an epichlorohydrine-dimethylamine), a polymer of an allylamine or its salt (e.g., a polymer of an allylamine or its salt, a polymer of a polyallylamine or its hydrochloride), a polymer of a diallyl$C_{1-4}$alkylamine or its salt (e.g., a polymer of a diallylmethylamine or its salt), a polymer of a diallyldi$C_{1-4}$alkylammonium salt (e.g., a polymer of a diallyldimethylammonium chloride), a copolymer of a diallylamine or its salt with a sulfur dioxide (e.g., diallylamine salt-sulfur dioxide copolymer), a diallyldi$C_{1-4}$ alkylammonium salt-sulfur dioxide copolymer (e.g., diallyldimethylammonium salt-sulfur dioxide copolymer), a copolymer of a diallyldi$C_{1-4}$alkylammonium salt with a diallylamine or its salt, or its derivative (e.g., a copolymer of a diallyldimethylammonium salt-diallylamine hydrochloride derivative), a diallyldi$C_{1-4}$alkylammonium salt polymer (e.g., diallyldimethylammonium salt polymer), a dialkylaminoethyl(meth)acrylate quaternary salt polymer [e.g., a di$C_{1-4}$alkylalkylaminoethyl(meth)acrylate quaternary salt polymer], a diallyldi$C_{1-4}$alkylammonium salt-acrylamide copolymer (e.g., a diallyldimethylammonium salt-acrylamide copolymer), an amine-carboxylic acid copolymer and the like. These polymeric dye fixing agent can be used singly or in combination.

The ratio of the dye fixing agent is, on solid basis, about 1 to 200 parts by weight (e.g., about 1 to 50 parts by weight), preferably about 5 to 150 parts by weight (e.g., about 5 to 40 parts by weight), more preferably about 10 to 100 parts by weight (e.g., about 10 to 30 parts by weight), and usually about 10 to 60 parts by weight relative to 100 parts by weight of the film-forming resin component.

(Additives)

If necessary, the transfer layer may contain a variety of additives, for example, the other dye fixing agents, stabilizers (e.g., antioxidants, ultraviolet ray absorbers, thermal stabilizers), antistatic agents, flame retardants, lubricants, antiblocking agents, fillers, coloring agents, antifoaming agents, coatability improving agents, thickeners and the like. The hot-melt adhesive fine particle may contain adhesion imparting agents (e.g., rosin or its derivative, hydrocarbon-series resins), waxes and the like beside the above additives.

The coating amount of the transfer layer is about 1 to 100 $g/m^2$, preferably about 10 to 60 $g/m^2$ and more preferably about 10 to 50 $g/m^2$ (e.g., about 20 to 40 $g/m^2$). The thickness of the transfer layer is about 5 to 90 $\mu$m, preferably about 10 to 70 $\mu$m, and usually about 5 to 60 $\mu$m (in particular, about 10 to 50 $\mu$m). Incidentally, the thickness of the transfer layer means a minimum thickness of the coating layer formed with the use of a coating agent comprising a hot-melt adhesive fine particle.

Moreover, if necessary, a porous layer, an antiblocking layer, a lubricating layer, an antistatic layer and others may be formed on the transfer layer.

[Protecting Layer]

In the transfer sheet of the present invention, a protecting layer which is capable of separating from the support may be disposed between the support and the transfer layer. The protecting layer may be disposed between the support and the transfer layer, and has a role of protecting the transfer layer after transferring on the image-receiving material. In particular, washing resistance is dramatically improved by disposing the protecting layer.

As the protecting layer, a variety of thermoplastic resins and thermosetting resins, in particular, a polymer having film-forming properties (especially, a polymer having non-adhesiveness, flexibility and suppleness) can be employed as far as the protecting layer is capable of separating from the support and protecting the transfer layer, and the quality of a transfer image is not deteriorated. As the thermoplastic resin, there may be mentioned a variety of resins such as polyamide-series resins, polyester-series resins, styrenic resins, polyolefinic resins, polycarbonate-series resins, polyvinyl acetate-series resins, acrylic resins, vinyl chloride-series resins, and thermoplastic urethane-series resins. As the thermosetting resin, there may be mentioned urethane-series resins, epoxy-series resins, phenolic resins, melamine-series resins, urea resins, and silicone-series resins. Among these resins, urethane-series resins (e.g., the above thermoplastic urethane-series resins) and/or cationic resins, in particular, cationic thermoplastic urethane-series resins are preferred since such resins have high wettability or compatibility toward a support and protect the transfer layer efficiently.

As the urethane-series resin, the above exemplified resins can be employed, and as the thermoplastic urethane-series resin, a polyester-type urethane-series resins obtained with the use of at least a polyester diol as a diol component, especially, a polyester-type urethane-series resin obtained with the use of a diol component containing not less than 50% by weight (e.g., not less than 75% by weight) of an aliphatic polyester diol are preferred. Moreover, if necessary, urethane-series resin may be used as a thermoplastic elastomer obtained with the use of a diamine component as a chain-extending agent. As the thermoplastic urethane-series elastomer, for example, there may be mentioned an elastomer containing an aliphatic polyether and/or polyester as a soft segment and a polyurethane unit of a short-chain glycol as a hard segment. As the cationic thermoplastic urethane-series resin, there may be mentioned an urethane-series resins into which the above exemplified tertiary amino group or the quaternary ammonium salt is incorporated.

The coating amount of the protecting layer is about 0.1 to 20 $g/m^2$, preferably about 1 to 10 $g/m^2$ and more preferably about 1 to 7 $g/m^2$. The thickness of the protecting layer is about 0.1 to 10 $\mu$m, preferably about 1 to 5 $\mu$m.

[Production Process]

The transfer sheet of the present invention can be produced by forming the transfer layer on at least one side of the support. The transfer layer can be formed by coating a release surface of the support with a coating agent comprising a hot-melt adhesive particle, a film-forming resin component, and if necessary other components (e.g., dye fixing agent). The film-forming resin component can be usually used in the form of an aqueous solution or an emulsion. Therefore, the coating agent for a transfer layer can be prepared by mixing an aqueous solution or emulsion containing a film-forming resin component with a hot-melt adhesive particle, and if necessary, the other components. A solvent for an aqueous solution or an aqueous emulsion may be water only, or may optionally contain a hydrophilic organic solvent such as an alcohol.

When a protecting layer is formed, the transfer layer can be formed by coating a release surface of the support with a coating agent for a protecting layer comprising an urethane-series resin and the like, if necessary drying to form the protecting layer, and further by coating the protecting layer with the coating agent for the transfer layer.

The coating agent can be applied on at least one side of the support by a conventional method such as roller coating, air knife coating, blade coating, rod coating, bar coating, comma coating or graver coating. The heating or drying temperature of the coating layer can be suitably selected within the range between the melting point of the first hot-melt adhesive fine particle and that of the second hot-melt adhesive fine particle, according to the melting point of the hot-melt adhesive particle. That is, the transfer layer can be formed by drying the coating layer at a temperature of about 50 to 150° C., preferably about 60 to 120° C., and more preferably about 70 to 100° C. (particularly about 70 to 90° C.).

The transfer layer formed by the above method is suitable for forming an image by an ink jet printing (recording) system which comprises ejecting droplets of ink (in particular, aqueous ink) to record. A method for transferring a record image to an image-receiving material may comprise recording an image on the transfer layer by an ink jet recording system (for example, an ink jet printer), bringing the transfer layer into contact with the image-receiving material and heating the transfer layer, and peeling the transfer layer from the support to transfer the record image to the image-receiving material. A record image can be smoothly transferred or conveyed to an image-receiving material by applying an appropriate pressure (e.g., about 500 to 50,000 Pa) at an appropriate temperature (e.g., about 140 to 250° C., preferably about 140 to 200° C.) for an appropriate period (e.g., about 5 seconds to 1 minute) with bringing the transfer layer into contact with the image-receiving material, and then peeling the transfer layer (or the protecting layer) from the support. If necessary, the member having the transfer image may be heated for crosslinking.

As the image-receiving material, there may be mentioned two-dimensional or three-dimensional structures made of various materials such as fibers, papers, woods, plastics, ceramics and metals. Fabrics (e.g., T-shirts), plastic films or sheets, paper, and others may be usually employed as the image-receiving material.

The transfer sheet of the present invention has excellent stability in delivery of a paper as well as prevents the inside of the printer from staining. Moreover, because of being excellent in thermal transferability and adhesiveness, the transfer sheet is useful in forming a transfer image on an image-receiving material. Furthermore, since the transfer sheet is excellent in water resistance (washing resistance), and the transfer image having excellent texture can be formed in the case of thermal-transferring on an image-receiving material such as clothes and fabrics (e.g., woven fabrics), the transfer sheet is suitable for transferring on clothes such as T-shirts.

EXAMPLES

The following examples are intended to describe this invention in further detail and should by no means be interpreted as defining the scope of the invention. Incidentally, unless otherwise indicated, "part(s)" indicates the proportion by weight. Moreover, the species or characteristics of each component comprised in the transfer layer of the transfer sheets obtained in Examples and Comparative Examples and methods for evaluating various capabilities or properties of the transfer sheets are shown as follows. Incidentally, the transfer layers were formed by heating at 80° C.

(Characteristics of each component comprised in transfer layer)

Nylon 12 fine particle 1-1: manufactured by Daicel Huels, Co. Ltd., Bestamelt 430-P06, melting point of 110° C., the average particle size of 60 μm Nylon 12 fine particle 1-2: manufactured by Daicel Huels, Co. Ltd., Bestamelt 730-P1, melting point of 98° C., the average particle size of 100 μm Nylon 12 fine particle 2: manufactured by Daicel Huels, Co. Ltd., Bestamelt 640-P1, melting point of 76° C., the average particle size of 100 μm Urethane-series resin emulsion: manufactured by Shin Nakamura Kagaku, Co. Ltd., SP resin ME-307

Polyethylene glycol: manufactured by Sanyo Kasei Kogyo, Co. Ltd., PEG4000S

Dye fixing agent: manufactured by Senka, Co. Ltd., PAPIOGEN P109, quaternary ammonium salt-containing compound (Method for Printing)

With the use of an ink jet printer (manufactured by Seiko-Epson, Co. Ltd., PM-770C), on the transfer sheets obtained in Examples and Comparative Examples were individually printed a predetermined image with cyane, yellow, magenta, black, light cyane and light magenta inks to form the record image.

(Method for Transferring)

After printing to a transfer sheet, the transfer sheet laid with the printed side down was placed on a card white T-shirts (manufactured by Arai Seitaro Shoten K.K., L-size). The transfer sheet was ironed from the upper side thereof with loading of 98N (10kgf) with use of an iron (manufactured by Toshiba Corporation, TAD23). The ironed time was total 4 minutes while changing a part to be ironed every 5 seconds. Furthermore, the ironed transfer paper and T-shirts were cooled down enough, and then a release paper was separated from them.

(Method of Washing)

After transferring, the washing operation was carried out by adding 15 g of a neutral detergent to 15 L of warm water of 30° C., washing for 15 minutes, rinsing for 11 minutes and drying for 5 minutes. This cycle was repeated 5 times, and then the wash was allowed to dry spontaneously.

(Stability of Coating Layer on Delivery of Paper)

The defect (or lack) of the coating layer caused by delivery of a paper on printing was observed visually, and stability of the coating layer on delivery of the paper was evaluated according to the following criteria.

A: the coating layer hardly has the defects

B: there are no problems for the appearance of the transfer paper, however, a small amount of a stripped coating layer component(s) is adhered to the inside of the printer C: the coating layer has the defects, and the transfer paper is got serious line (or stripe) injures (Washing Resistance)

After washing, the transfer image part was observed visually, and the washing resistance was evaluated according to the following criteria.

A: the transfer image part hardly changes

B: the transfer image part discolors

C: the transfer image part is separated from the T-shirts (Spreadability or Permeation by Soaking)

After printing and transferring, the T-shirts was soaked in water at 23° C. for 15 seconds, and pulled up quickly, and then suspended it to allow to dry spontaneously. The degree of the spreadability or permeation was observed visually, and evaluated according to the following criteria.

A: there is hardly spreadability or permeation of the ink

B: there is a little spreadability or permeation in yellow

C: all colors are spread or permeated, and the fabric discolors.

(Ink Absorption)

Twenty seconds after of printing, a sheet of a PPC copying paper was placed on the solid-printed portion, and applied at a constant pressure. Thereafter, the copying paper was visually observed for the degree of offset, and was evaluated according to the following criteria.

A: no offset

B: there is slightly offset only in a dark color portion

C: there is also offset in a light color portion (Successive or Continuous Delivery of a Paper)

Ten (10) sheets of paper were printed successively or continuously, and the degree of undersupply (e.g., the paper was not supplied or delivered, or the paper clogged) was evaluated according to the following criteria.

A: no undersupply

B: two or less pieces of the paper are not supplied

C: the paper cloggs, or three or more sheets of the paper are not supplied

Examples 1 to 6 and Comparative Examples 1 to 3

An aqueous coating agent (or coating composition) was prepared by mixing the components shown in Table 1 in the proportion shown in Table 1 (on solid basis). The aqueous coating agent was coated on a paper for coating (manufactured by Lintec Corporation, BK6RB (S5)) at coating amount of 40 g/m and dried at 80° C. to obtain a transfer sheet composed of a transfer layer having thickness shown in Table 1. The evaluation results of the obtained transfer sheets are shown in Table 1.

TABLE 1

| | | Examples | | | | | | Comparative Examples | | |
|---|---|---|---|---|---|---|---|---|---|---|
| | | 1 | 2 | 3 | 4 | 5 | 6 | 1 | 2 | 3 |
| Transfer layer (parts by weight) | Nylon 12 fine particle 1-1 | 50.2 | 43.1 | 38.0 | — | — | — | 50.7 | — | — |
| | Nylon 12 fine particle 1-2 | — | — | — | 50.2 | 43.1 | 38.0 | — | 50.7 | — |
| | Nylon 12 fine particle 2 | 0.5 | 7.6 | 12.7 | 0.5 | 7.6 | 12.7 | — | — | 50.7 |
| | Urethane-series resin emulsion | 20.9 | 20.9 | 20.9 | 20.9 | 20.9 | 20.9 | 20.9 | 20.9 | 20.9 |
| | Polyethylene glycol | 15.4 | 15.4 | 15.4 | 15.4 | 15.4 | 15.4 | 15.4 | 15.4 | 15.4 |
| | dye fixing agent | 8.5 | 8.5 | 8.5 | 8.5 | 8.5 | 8.5 | 8.5 | 8.5 | 8.5 |
| fine particle 1/fine particle 2 (parts by weight) | | 99/1 | 85/15 | 75/25 | 99/1 | 85/15 | 75/25 | 100/0 | 100/0 | 0/100 |
| Capability | Stability of coating layer on delivery of paper | B | A | A | B | A | A | C | C | A |
| | Washing resistance | A | A | B | B | B | C | A | B | C |
| | Spreadability or permeation by soaking | A | A | A | A | A | A | A | A | A |
| | Ink absorption | A | A | A | A | A | A | A | A | A |
| | Successive or continuous delivery of paper | A | A | B | B | B | B | A | B | C |

As apparent from Table 1, the transfer sheets of Examples, which comprises two kinds or species of nylon fine particles (polyamide particles) different in melting point from each other, are excellent in various capabilities. On the contrary, since the transfer sheets of Comparative Examples 1 and 2 do not comprise a nylon fine particle having low melting point, they are inferior to the transfer sheets of Examples in stability of coating layer on delivery of a paper particularly. Since the transfer sheet of Comparative Example 3 does not comprise a nylon fine particle having high melting point, it is inferior to the transfer sheets of Examples in successive or continuous delivery of a paper and washing resistance.

What is claimed is:

1. A transfer sheet comprising a support, and a transfer layer for receiving an ink, wherein the transfer layer is formed on the support by heating at a predetermined temperature and is separable from the support, and wherein the transfer layer contains a hot-melt adhesive particle comprising a first particle having a melting point more than the predetermined temperature and a second particle having a melting point not more than the predetermined temperature.

2. A transfer sheet according to claim 1, wherein the melting point of the first particle is more than 80° C., and the melting point of the second particle is not more than 80° C.

3. A transfer sheet according to claim 1, wherein the difference in melting point between the first particle and the second particle is not less than 100° C.

4. A transfer sheet according to claim 1, wherein the melting point of the first particle is 100 to 120° C., and the melting point of the second particle is 60 to 80° C.

5. A transfer sheet according to claim 1, wherein the average particle size of the first particle is larger than the thickness of the transfer layer.

6. A transfer sheet according to claim 1, wherein the average particle size of the first particle is 30 to 100 $\mu$m.

7. A transfer sheet according to claim 1, wherein the ratio of the first particle relative to the second particle is 99/1 to 80/20 (weight ratio).

8. A transfer sheet according to claim 1, wherein the first particle and the second particle comprise a polyamide-series particle.

9. A transfer sheet according to claim 8, wherein the polyamide-series particle comprises a polyamide having at least one monomer unit selected from monomer units constituting nylon 11 and nylon 12, or a polyamide formed by reacting a dimer acid and a diamine.

10. A transfer sheet according to claim 1, wherein the hot-melt adhesive particle comprises a first polyamide-series particle having a melting point of 100 to 120° C. and having an average particle size of 40 to 80 μm and a second polyamide-series particle having a melting point of 60 to 80° C., and the ratio of the first polyamide-series particle relative to the second polyamide-series particle is 95/5 to 80/20 (weight ratio).

11. A transfer sheet according to claim 1, wherein the transfer layer further comprises a film-forming resin component.

12. A transfer sheet according to claim 11, wherein the film-forming resin component comprises at least one member selected from the group consisting of a hydrophilic polymer, an urethane-series resin and a thermosetting or crosslinking resin.

13. A transfer sheet according to claim 11, wherein the transfer layer further comprises a dye fixing agent.

14. A transfer sheet according to claim 13, wherein the transfer sheet comprises 10 to 10,000 parts by weight of the hot-melt adhesive particle and 1 to 200 parts by weight of the dye fixing agent relative to 100 parts by weight of the film-forming resin component.

15. A transfer sheet according to claim 1, wherein the transfer layer comprises:

a hot-melt adhesive particle containing a first polyamide-series particle which has an average particle size of 40 to 80 μm, and a melting point of 100 to 120° C., and a second polyamide-series particle which has a melting point of 60 to 80° C.;

a polyoxyalkylene glycol-series resin;

a polyester-type urethane-series resin; and a cationic compound, and the ratio of the first polyamide-series particle relative to the second polyamide-series particle is 95/5 to 80/20 (weight ratio), and wherein the transfer layer comprises 10 to 5,000 parts by weight of the hot-melt adhesive particle and 5 to 150 parts by weight of the cationic compound relative to 100 parts by weight of the total amount of the polyoxyalkylene glycol-series resin and the polyester-type urethane-series resin.

16. A transfer sheet according to claim 15, wherein the ratio of the ratio of the polyoxyalkylene glycol-series resin relative to the polyester-type urethane-series resin is 90/10 to 10/90 (weight ratio).

17. A method for producing a transfer sheet according to claim 1 comprising a support and a transfer layer, wherein the method comprises applying, on a release side of the support, a coating agent composed of a first hot-melt adhesive particle and a second hot-melt adhesive particle, and drying the coating agent at a heating temperature to form the transfer layer, wherein the a first particle has a melting point more than the heating temperature and the second particle has a melting point not more than the heating temperature.

18. A method for producing a transfer sheet according to claim 17, wherein the first hot-melt adhesive fine particle has a melting point more than 80° C. and an average particle size of 30 to 100 μm, and the second hot-melt adhesive fine particle has a melting point not more than 80° C.

19. A method for transferring a record image to an image-receiving material, which comprises recording an image on the transfer layer of the transfer sheet recited in claim 1 by an ink jet recording system, bringing the transfer layer into contact with the image-receiving material and heating the transfer layer, and peeling the transfer layer from the support to transfer the record image to the image-receiving material.

* * * * *

UNITED STATES PATENT AND TRADEMARK OFFICE
CERTIFICATE OF CORRECTION

PATENT NO. : 6,878,423 B2
DATED : April 12, 2005
INVENTOR(S) : Hideki Nakanishi

It is certified that error appears in the above-identified patent and that said Letters Patent is hereby corrected as shown below:

<u>Column 18,</u>
Line 56, is corrected to read -- second particle is not less than 10ºC. --.

Signed and Sealed this

Fourth Day of October, 2005

JON W. DUDAS
*Director of the United States Patent and Trademark Office*